United States Patent [19]

Goel

[11] Patent Number: 4,661,562

[45] Date of Patent: Apr. 28, 1987

[54] THERMOSET POLYMERS FROM POLYEPOXIDES AND POLYCARBOXYLIC ACIDS CONTAINING CATALYTIC AMOUNTS OF ALKALI AND ALKALINE EARTH METAL CATIONIC COMPLEXES

[75] Inventor: Anil B. Goel, Worthington, Ohio

[73] Assignee: Ashland Oil, Inc., Ashland, Ky.

[21] Appl. No.: 795,028

[22] Filed: Nov. 4, 1985

[51] Int. Cl.$^4$ .............................................. C08G 59/68
[52] U.S. Cl. ...................................... 525/122; 528/89; 528/91; 528/92; 528/95; 528/111.3; 528/112; 528/365
[58] Field of Search .................... 528/91, 95, 112, 365, 528/89, 92, 88, 111.3; 525/122

[56] References Cited

U.S. PATENT DOCUMENTS

| | | | |
|---|---|---|---|
| 4,092,296 | 5/1978 | Skiff | 528/91 |
| 4,321,351 | 3/1982 | Zuppinger et al. | 528/91 |
| 4,358,578 | 11/1982 | Brownscombe | 528/91 |
| 4,379,908 | 4/1983 | Brownscombe | 528/91 |
| 4,396,754 | 8/1983 | Brownscombe | 528/91 X |
| 4,456,698 | 6/1984 | Brownscombe | 502/203 |

*Primary Examiner*—Earl Nielsen
*Attorney, Agent, or Firm*—John F. Jones

[57] ABSTRACT

A process for the rapid formation of thermoset polymers by polymerizing a mixture of a polyepoxide with a polycarboxylic acid containing an alkali or alkaline earth metal cationic complex catalyst is disclosed.

8 Claims, No Drawings

THERMOSET POLYMERS FROM POLYEPOXIDES AND POLYCARBOXYLIC ACIDS CONTAINING CATALYTIC AMOUNTS OF ALKALI AND ALKALINE EARTH METAL CATIONIC COMPLEXES

This invention relates to a process for the preparation of thermoset polymers at a rapid rate by the reaction of polyepoxides with polycarboxylic acids which contain catalytic amounts of alkali or alkaline earth metal cationic complexes.

Polyepoxides and epoxy resins are known to react with carboxylic acids at a slow rate and at elevated temperatures to give polyester polymers. The homopolymerization of epoxy resins using alkali and alkaline earth metal cationic catalysts has been described recently in U.S. Pat. No. 4,456,698.

I have discovered a two-component polymerization system composed of a polyepoxide compound as one component and a mixture of a polycarboxylic acid and an alkali or alkaline earth metal cationic complex as the other component which produces thermoset polymers at a fast rate and that these thermoset polymers have excellent physical properties including unusually high thermal stability and that this polymerization system is suitable for use in high productivity two-component structural adhesives, in reaction injection molding (RIM) and in other well-known polymer applications.

Polyepoxides, also called epoxy resins, have been known to cure with a number of curing agents including polycarboxylic acids, carboxylic acid anhydrides, etc. These polymerization reactions of epoxy resins with carboxylic acids to give polyester polymers are generally slow and require catalysts and accelerators such as stannous carboxylates and require high curing temperatures. Homopolymerization of epoxy resins is known to proceed in the presence of cationic catalysts. For instance, U.S. Pat. No. 4,456,698 describes the curing of epoxy resins (homopolymerization) by using the alkali and alkaline earth metal cationic catalysts. This patent describes the use of such catalysts either by dispersing them directly into the epoxy resins or by mixing the epoxy resins with a solution of catalysts in small amounts of water, alcohols, ethers and ketones. In such cases, the solvent is either removed prior to polymerization or left blended in the polymer which is undesirable in some applications where a complete reactive solid system is needed. Such applications include structural adhesives, RIM and composites.

I have discovered that epoxy resins can be polymerized with polycarboxylic acids in the presence of catalytic amounts of alkali and alkaline earth metal cationic complexes to give rapid setting thermoset polymers which have unusually high temperature stability showing thermal decomposition temperatures well over 400° C.

The cationic catalysts useful in this invention include those having the formula M(X)n wherein M represents an alkali metal or an alkaline earth metal such as lithium, sodium, potassium, magnesium, calcium, and the like, and X represents a nucleophilic anion such as BF4, PF6, ClO4, SbF6, AsF6, BPh4 and the like and represents 1 or 2. Other known cationic catalysts such as BF3.Ether, BF3.Amine, Lewis acids and the like may also be used.

The polycarboxylic acids useful in this invention are those having the formula Y(COOH)n wherein Y is a hydrocarbon group having at least 1 carbon atom and preferably from 1 to 20 carbon atoms, and Y can also contain one or more functional groups such as ether, ester, amide, and the like, Y can also contain olefinic and aromatic unsaturated moieties and n is a number of at least 2 and preferably a number from 2 to 10.

The polyepoxides or epoxy resins useful in the present invention can be monomeric or polymeric, saturated or unsaturated, aliphatic, cycloaliphatic, aromatic or heterocyclic, and they can be substituted if desired with other substituents besides the epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 1, that is to say, compounds containing more than one group of the formula

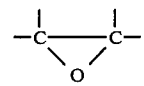

The 1,2-epoxide groups may be either terminal or inner ones. Particularly suitable terminal 1,2-epoxide groups are 1,2-epoxyethyl or 1,2-epoxypropyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, and vinyl cyclohexene diepoxide; epoxidized diolefinically unsaturated carboxylic acid esters, such as methyl-9,10,12,13-diepoxy stearate, or the dimethyl ester of 6,7,10,11-diepoxyhexadecane-1,16-dicarboxylic acid. Furthermore, there may be mentioned epoxidized mono-, di- or poly-acetals containing at least one cyclo-aliphatic 5-membered or 6-membered ring, to which at least two 1,2-epoxide groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

Although the preferred polyepoxides are those containing at least two epoxy groups per molecule and also include one or more hydroxyl group per molecule, epoxides containing no hydroxyl groups are also useful.

Thus, when a solution or suspension of a small amount of the cationic catalyst in a polycarboxylic acid is mixed with an epoxy resin, rapid gelation takes place to give a thermoset polymer. The amount of catalyst used should be in the range of from about 0.05 to 10% by weight based on the weight of the epoxy resin and the equivalents of epoxy resin to equivalents of the polycarboxylic acid should be in the range of from about 50:1 to 1:1. In any event, the equivalent amount of the epoxy resin should always be in excess of the equivalent amount of polycarboxylic acid. In the process of this invention the final thermoset polymer contains poly(ester-ether-hydroxyl) groups. The polymerization can be carried out in the temperature range of from about room temperature up to about 200° C. Optionally reactive additives such as dicarboxylic anhydrides, polyols, oxazolines, and the like may also be included in the process of this invention. Also, additives such as fillers, reinforcement fibers, mats and bars, pigments, flame retardant agents, antioxidants, plasticizers stabilizers, thixotropic agents, and other additives known to those skilled in the art may also be included in the polymerization process of this invention.

The two-component system comprising component A the polyepoxide which may contain flexibilizers such as rubber, urethane thermoplastics and the like and component B which is the polycarboxylic acid containing the cationic catalyst and optionally may contain additives such as polyols, dicarboxylic anhydrides, and the like, provides a convenient way of use in applications such as structural adhesives. The process of this invention produces a product which has excellent adhesion to cold rolled steel, for instance.

The process of this invention is further illustrated in the following representative examples.

EXAMPLE 1

To 100 g of dimerized linoleic acid (carboxylic acid equivalent weight of 292) was added 5 g of lithium fluoborate dissolved in 15 g of methanol with mixing to give a homogeneous mixture. The methanol was then stripped off from the mixture on a rotary evaporator under reduced pressure. Part (2 g) of this dimerized linoleic acid containing lithium fluoborate catalyst was mixed with 10 g of liquid diglycidyl ether of Bisphenol-A (epoxy equivalent weight of 180–195) and the resulting mixture was heated at about 120° C. A rapid polymerization occurred within two minutes to give a hard thermoset polymer. The polymer was postcured at 160° C. for one hour and the resulting polymer was found to have a Tg by Differential Scanning Calorimetry (DSC) of 77.4° C. and a 10% weight loss by Thermo Gravimetric Analysis (TGA) in nitrogen occurred at 422° C.

EXAMPLE 2

Lithium tetrafluoroborate (0.5 g) was mixed with 10 g of glutaric acid at 100° C. Part of this mixture (1.05 g) was mixed with 4 g of the epoxide of Example 1 at 120° C. A rapid gelation occurred within 25 seconds to give a thermoset polymer which was postcured at 150°–160° C. for three hours. The resulting polymer was found to have a Tg by DSC of 80.9° C. and the thermal decomposition temperature (10% weight loss) by TGA was 420° C.

EXAMPLE 3

A mixture of 3 g of dimerized linoleic acid, 1.5 g of glutaric acid and 0.08 g of lithium fluoborate prepared at 90° C. was mixed with 10 g of the epoxy resin of Example 1 and the mixture was heated at 120° C. Polymerization occurred within thirty seconds to give a hard solid polymer. The postcured polymer at 150°–160° C. for three hours showed thermal decomposition (10% weight loss in nitrogen by TGA) at 443.4° C.

EXAMPLE 4

The mixture of 3 g of dodecanedioic acid, 0.03 g of lithium fluoborate and 8 g of the epoxy resin of Example 1 upon heating at 120°–125° C. gelled within ten seconds to give the thermoset polymer. The sample which was postcured at 160° C. for two hours showed thermal decomposition (TGA) at 432° C.

EXAMPLE 5

A mixture of dimerized linoleic acid (15 g), poly (propylene oxide) diol (hydroxyl equivalent weight of 1000) (5 g) and 1 g of a 30% solution of magnesium fluoborate in water was prepared and the water was stripped off in a rotary evaporator. Part (3 g) of this mixture was used to cure 10 g of the epoxy resin described in Example 1 at 120° C. A rapid gelation occurred within 30 seconds to give the thermoset polymer which was postcured at 160° C. for two hours. The resulting polymer was found to have a thermal decomposition of 408° C.

EXAMPLE 6

To 180 g of the epoxy resin of Example 1 was added 20 g of carboxylic acid terminated butadiene/acrylonitrile rubber which contained 18% by weight of acrylonitrile and 0.5 g of triphenyl phosphine. The resulting mixture was heated at 120° C. for 30 minutes. The resulting mixture was filled with 50 g of dry talc filler to give the component A. Component B was prepared by mixing 200 g of dimerized linoleic acid, 5 g of lithium fluoborate and 40 g of dry talc filler at 60° C. Component A (15 g) and component B (5 g) were mixed and a small portion of this mixture was applied between two 1 inch wide and 4 inch long cold rolled steel coupons to form a 30 mil thick film covering a one square inch area. The bond which was cured at 100° C. for ten minutes and postcured at 140° C. for 30 minutes showed a lap shear strength of 2360 psi.

I claim:

1. A process for the rapid formation of thermoset polymers comprising reacting at a temperature in the range from about room temperature to about 200° C., a polyepoxide with a polycarboxylic acid which contains a catalytic amount of a catalyst having the formula $M(x)_n$ wherein M represents an alkali metal or an alkaline earth metal, X represents $BF_4$, $PF_6$, $ClO_4$, $SbF_6$, $AsF_6$, or $BPh_4$ and n represents 1 or 2 wherein the catalyst is present in from about 0.05 to 10% by weight based on the polyepoxide and the ratio of equivalents of polyexpoxide to equivalents of polycarboxylic acid is in the range of from about 50:1 to 1:1.

2. The process of claim 1 wherein the polycarboxylic acid is one having the formula $Y(COOH)_n$ wherein Y represents a hydrocarbon group having from 1 to 20 carbon atoms or a hydrocarbon having from 1 to 20 carbon atoms which also contains one or more functional groups selected from the group consisting of ether, ester, amide, olefinic and aromatic groups and n represents a number of from 2 to 10.

3. The process of claim 2 wherein the polyepoxide is a compound containing more than one group of the following formula

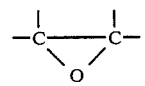

4. The process of claim 3 wherein the polyepoxide is the diglycidyl ether of Bis-phenol-A, the polycarboxylic acid is dimerized linoleic acid and the catalyst is lithium fluoborate.

5. The process of claim 3 wherein the polyepoxide is the diglycidyl ether of Bis-phenol-A, the polycarboxylic acid is glutaric acid and the catalyst is lithium fluoborate.

6. The process of claim 3 wherein the polyepoxide is the diglycidyl ether of Bis-phenol-A, the polycarboxylic acid is a mixture of dimerized linoleic acid and glutaric acid and the catalyst is lithium fluoborate.

7. The process of claim 3 wherein the polyepoxide is the diglycidyl ether of Bis-phenol-A, the polycarboxylic acid is dodecanedioic acid and the catalyst is lithium fluoborate.

8. The process of claim 3 wherein the polyepoxide is the diglycidyl ether of Bis-phenol-A modified with a carboxylic acid terminated butadiene/acrylonitrile rubber, the polycarboxylic acid is dimerized linoleic acid and the catalyst is lithium fluoborate.

* * * * *